US006456449B1

(12) United States Patent
Belser et al.

(10) Patent No.: US 6,456,449 B1
(45) Date of Patent: Sep. 24, 2002

(54) DISK DRIVE WITH WIDE SERVO BURST PATTERN AND WIDE SERVO SENSING ELEMENT

(75) Inventors: Karl Arnold Belser; Wayne Leung Cheung, both of San Jose; Dave Anthony Freitas, Morgan Hill; Ju-Hi John Hong, San Jose; Mohamad Towfik Krounbi, San Jose; Michael Paul Salo, San Jose; Scott Arthur Thomas, San Jose, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/908,725

(22) Filed: Aug. 7, 1997

(51) Int. Cl.[7] .................................................. G11B 5/58
(52) U.S. Cl. ...................... 360/77.01; 360/75; 360/113
(58) Field of Search ........................... 360/77.08, 78.04, 360/78.05, 77.01, 113, 77.11, 75

(56) References Cited

U.S. PATENT DOCUMENTS

| | | | |
|---|---|---|---|
| 4,040,113 A | 8/1977 | Gorter | 360/113 |
| 4,313,140 A | 1/1982 | Keidl | 360/77.11 X |
| 4,314,289 A | 2/1982 | Haynes | 360/77.11 X |
| 4,539,607 A * | 9/1985 | Fujiki | 360/77.08 |
| 4,814,919 A | 3/1989 | Kitada et al. | 360/113 |
| 4,821,012 A | 4/1989 | Kamo et al. | 388/32 |
| 4,825,318 A | 4/1989 | Hoo et al. | 360/121 X |
| 4,912,585 A | 3/1990 | Belser et al. | 360/135 |
| 4,977,471 A | 12/1990 | Nigam | 360/77.08 |
| 5,027,233 A | 6/1991 | Berti et al. | 360/77.02 |
| 5,079,663 A | 1/1992 | Ju et al. | 360/113 |
| 5,107,385 A | 4/1992 | Kelley | 360/113 |
| 5,229,895 A | 7/1993 | Schwarz et al. | 360/77.12 |
| 5,381,281 A | 1/1995 | Shrinkle et al. | 360/77.08 |
| 5,408,373 A | 4/1995 | Bajorek et al. | 360/104 |
| 5,426,543 A | 6/1995 | Dy et al. | 360/77.12 |
| 5,448,429 A | 9/1995 | Cribbs et al. | 360/77.08 X |
| 5,471,354 A | 11/1995 | Bortins et al. | 360/77.05 |
| 5,555,142 A * | 9/1996 | Komai et al. | 360/113 |
| 5,587,850 A | 12/1996 | Ton-that | 360/77.08 |
| 6,104,562 A * | 8/2000 | Ottesen et al. | 360/63 |

FOREIGN PATENT DOCUMENTS

| | | | |
|---|---|---|---|
| JP | 87214356 | 3/1989 | G11B/5/265 |
| JP | 8965179 | 10/1990 | G11B/21/10 |

OTHER PUBLICATIONS

Bajorek et al., "Large Surface Air Bearing for a Flexible Disc File", *IBM Technical Disclosure Bulletin*, vol. 18, No. 11, Apr. 1976, 3859–60.

Barlow et al., "Thin Film Magnetic Head Assembly", *IBM Technical Disclosure Bulletin*, vol. 24, No. 4, Sep. 1981, 1912–13.

Jones, "Parallel Servo–Track Write and Read Verification with Side–by–Side Inductive Head Elements", *IBM Technical Disclosure Bulletin*, vol. 26, No. 8, Jan. 1984, 4243–44.

* cited by examiner

Primary Examiner—Glenton B. Burgess
Assistant Examiner—K. Wang
(74) Attorney, Agent, or Firm—Gray Cary Ware & Freidenrich; Brian C. Kunzler (57) ABSTRACT

A magneto-resistive (M-R) head has a read element with a servo sensing width as wide as a data track width and a data sensing width of less than one data track width. The two read sensing widths are achieved by using a single read element having a center electrical contact from the M-R read element that effectively reduces the sensing width of the read element. In a first embodiment, the servo sensing width comprises a first portion of the read element and the data sensing width comprises a second, smaller portion of the read element. In a second embodiment, the servo sensing width comprises the entire read element width and the data sensing width comprises a portion thereof. In yet another embodiment, abutting read elements are constructed to enable separate optimization of each sensing width. The wide servo sensing width permits use of a wide servo pattern having servo bursts as wide as a data track width. A position error sensing (PES) signal produced with the wide servo read element and wide servo pattern has increased linearity and accuracy.

25 Claims, 8 Drawing Sheets

DISK DRIVE WITH WIDE SERVO BURST PATTERN AND WIDE SERVO SENSING ELEMENT

BACKGROUND OF THE INVENTION

1. Field of the Invention

This invention relates generally to magnetic head servo control systems and, more particularly, to disk drive position control systems that determine the location of a head relative to disk tracks.

2. Description of the Related Art

In a conventional computer disk drive sector servo system, servo information is stored in servo bursts recorded in a magnetic storage material as a series of magnetic flux reversals. When the disk rotates beneath a read/write head, a magnetic read element of the head senses the changes in flux and produces a varying electrical readback signal. The electrical signal can be decoded to indicate the head position relative to tracks of the disk. In this way, the read/write head can be accurately positioned relative to data tracks of the disk for data read and write operations.

Each disk surface of a sector servo disk drive includes concentric or spiral tracks that are divided into radial sectors having a short servo track information area followed by a customer data area. The servo track information area typically includes a sector marker, track identification data, and a servo burst pattern. The sector marker indicates to the data read/write head that servo information immediately follows in the track. The servo read head can be the same head used for reading data or can be a separate, dedicated servo head. The servo pattern readback signal is demodulated to produce a position error sensing (PES) signal. The PES signal is used to generate a corrective input signal that is applied to the read/write head positioning servo.

Figure 1:
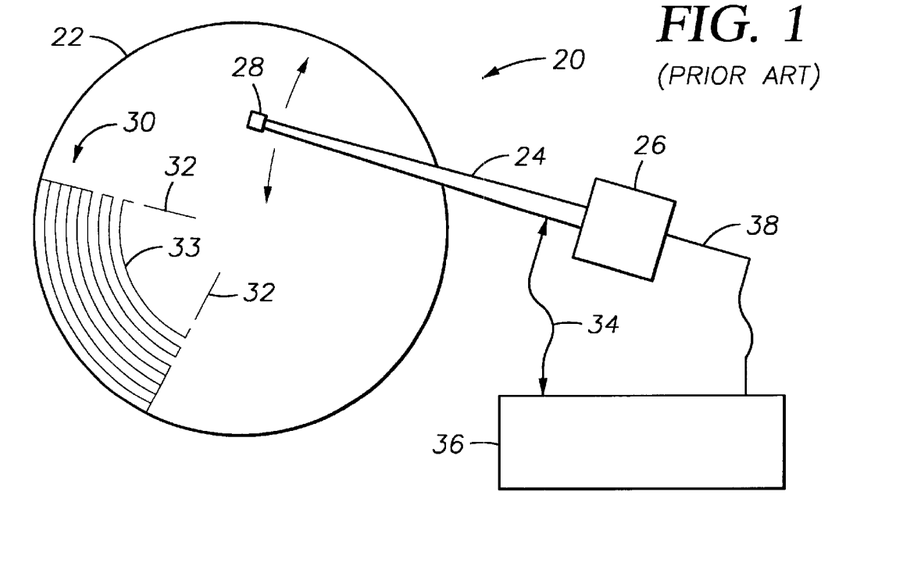
FIG. 1 is a representation of a conventional disk drive system.

FIG. 1 shows a conventional disk drive system 20 having a rotatable storage disk 22 and a rotary arm 24 that is moved by a servo motor 26. The read/write head 28 is suspended over the disk at one end of the arm. The disk 22 has concentric tracks 30 and is divided into sectors that are defined by radially spaced sector marker fields 32, of which two are shown. It should be understood that conventional disk drives typically contain approximately one hundred sectors and more than 5000 data tracks; fewer are indicated in FIG. 1 for simplicity of illustration. Customer data is recorded by a user into the track spaces 33 between the sector markers. The read/write head 28 produces a readback signal when reading information from the disk 22 and receives a write signal when recording information onto the disk surface. The readback signal and write signal are carried to and from the read/write head 28 over data and servo lines 34, which are coupled to a disk drive controller 36.

When the read/write head 28 is located over servo information recorded into the disk, the disk controller 36 receives position information and in response generates a position error sensing (PES) signal that indicates the position of the head relative to a disk track. The PES signal is used by the disk drive controller 36 to generate servo commands that control the servo motor 26, and are provided over a servo line 38 to maintain the head in a correct (centered) position.

Figure 2:
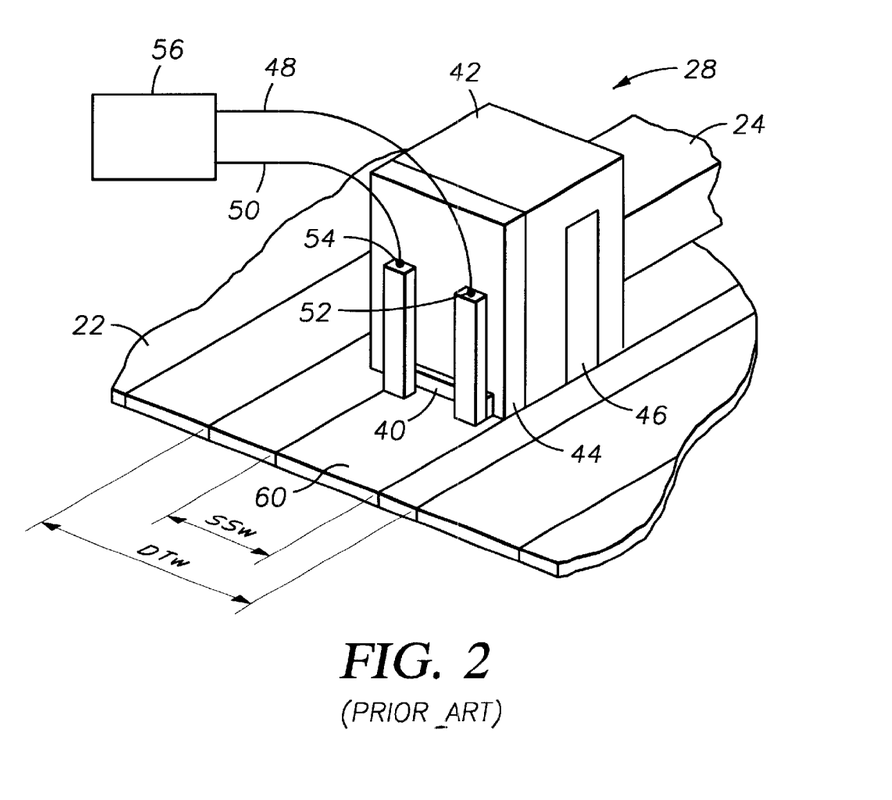
FIG. 2 is a representation of the read/write head of the conventional disk drive system illustrated in FIG. 1.

FIG. 2 shows the read/write head 28 of FIG. 1 in greater detail. The head 28 comprises what is commonly referred to as a magneto-resistive (M-R) head, which includes an M-R read element 40 and an inductive write element 42. The M-R read element 40 is placed on a non-magnetic support piece 44 over which is formed the write element 42. The write element includes a magnetic gap 46 formed at the top of a pair of magnetic pole pieces 41, 43 joined at the other end 45, and electromagnetic coils sandwiched therebetween (not shown in FIG. 2). Two electrical wires 48, 50 are connected to read contacts 52, 54 and carry the sensed readback signal from the M-R head read element 40 back to signal processing circuitry 56. The combined read/write head shown in FIG. 2 permits a single head to include both read and write elements and thereby simplifies production and design.

The read/write head 28 is shown in FIG. 2 above a track 60 of the disk 22. The extent of a data track is represented by the data track width (DTW) shown in FIG. 2. The servo information is recorded in servo pattern bursts that have a width approximately equal to the track width DTW. FIG. 2 also shows the extent of the servo sensing width (SSW), the width of the portion of servo information sensed by the head 28 and used by the disk drive controller 36 in maintaining the head centered above a disk track. It should be appreciated that data tracks and servo tracks are located in separate circumferential regions of the disk, as shown in FIG. 1, but that the DTW and SSW are shown in FIG. 2 together, juxtaposed only for illustration of relative size.

The disk controller 36 controls the servo motor 26 (FIG. 1) to maintain the read/write head 28 above a track 60 of the disk 22 in response to the head readback signal. The track 60 represents one of the tracks 33 illustrated in FIG. 1; therefore, tracks for storing data will be repeated across the disk 22 at an interval of one DTW wide. As noted above, the head readback signal is generated from sensed servo pattern bursts. The servo pattern bursts are recorded in the disk tracks as magnetic field transitions that extend radially across the width of the disk tracks 33.

Figure 3A:
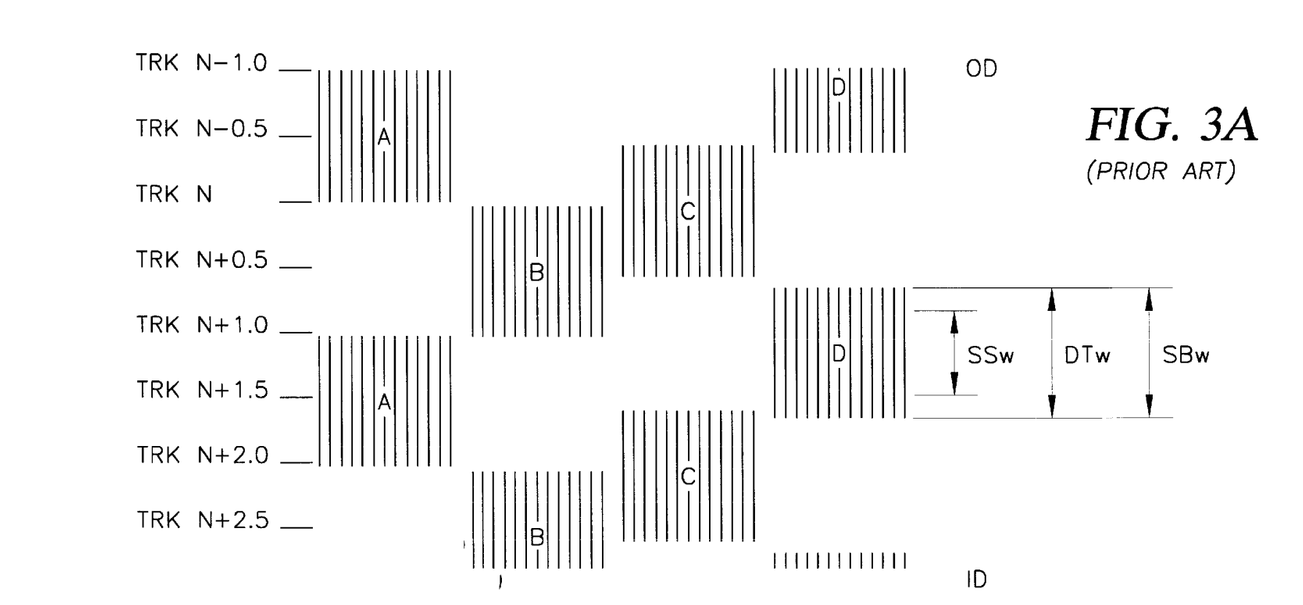
FIG. 3A is a representation of a conventional quad-burst servo pattern such as illustrated in FIG. 1, in a vertical orientation.

FIG. 3A shows a conventional servo burst pattern comprising an A, B, C, D quadrature burst pattern that is repeated radially within servo information portions of the disk (FIG. 1). The tracks run horizontally across the sheet, from left to right. The numbers of respective tracks 33 are shown along the left side of the drawing figure and indicate respective track and half-track centerlines. Thus, the horizontal lines aligned with Tracks N and N+1.0 indicate the centerlines of disk track N and N+1, respectively, and the line aligned with N+0.5 indicates the halfway position between these tracks. Each of the quadrature servo bursts A, B, C, D shown in FIG. 3A is approximately one full data track width (DTW) across. Thus, the top-left "A" servo burst of FIG. 3A extends approximately from track N−1.0 to track N. The adjacent "B" servo burst extends approximately from track N to track N+1.0 and the adjacent "C" servo burst extends approximately from track N−0.5 to track N+0.5. The full "D" servo burst shown in FIG. 3A extends approximately from half track position N+0.5 to half track N+1.5.

It should be understood that servo pattern widths other than the one-track width shown in FIG. 3A are possible. For example, many disk drive systems currently utilize servo patterns that are two-thirds or one-half width of a data track, rather than the one-track width shown. Moreover, it is not necessary to use the quadrature servo bursts shown in FIG. 3A. It also is common to use dual burst servo patterns. Dual burst servo patterns generally comprise either the A, B servo bursts or the C, D servo bursts of the quadrature pattern illustrated in FIG. 3A.

Customer data to be recorded into and read from the data tracks cannot occupy the full width of a data track, because otherwise the magnetic field emitted by the read/write head upon recording data in one track would interfere with data recorded in adjacent tracks. Therefore, the write head is typically less than one data track wide, often approximately 85% of DTW. Recording at less than full width and spacing the customer data apart from track to track by increments of approximately one DTW ensures that data recording can take place safely in adjacent tracks.

In the sector servo disk illustrated in FIG. 1, the read element 40 of the read/write head 28 is used to read both servo information and customer data recorded on the disk. The read element is typically optimized for reading the customer data, which will be recorded on the disk 22 with the write element 42. For improved reading of customer data, the width of the read element 40 should be less than the width of the data track. For example, many read elements are 50% of a data track width. This provides optimal reading of customer data which, as noted, cannot occupy an entire data track width.

The servo patterns, however, often occupy more width than the data. For example, FIG. 3A shows a servo pattern that is one full DTW, whereas customer data will occupy approximately 85% DTW. The difference in size between servo information and customer data can result in nonlinear response of the read element when reading servo information. This nonlinearity can be reduced somewhat by making the servo pattern bursts smaller, to more nearly the size of the written data (85% of DTW). Unfortunately, servo patterns with smaller widths will increase the number of write steps necessary to record the servo patterns.

The servo pattern bursts A, B, C, and D shown in FIG. 3A are typically produced with a two-step servo write process during a track formatting operation before final disk drive assembly. The servo write process is generally referred to as a "move and write" process because the read/write head is moved, a portion of the servo burst is recorded, and the process is repeated. With each servo write step, a portion of each servo burst is recorded into the disk by energizing the write coils in the read/write head 28. Usually, two write steps per servo pattern burst are all that is needed. After the first portion of a servo pattern burst is written, the read/write head is moved radially a predetermined distance that is typically less than one-half a data track width (DTW), such as one-fourth or one-third DTW. Once the head has been moved, the second portion of the servo pattern burst is recorded, completing the servo pattern burst.

For example, the pattern of FIG. 3A would be written by first recording half of an A burst, moving the head and, on a subsequent disk revolution, recording the next half of the A burst. Although the magnetic flux transitions written by the write element into the disk are greater than one-fourth DTW or one-third DTW, the proper size is obtained by erasing a part of the written burst on subsequent steps in a process commonly called trimming. It should be appreciated that the transitions of the two burst halves making up the servo pattern burst must be aligned radially (vertically on the FIG. 3A drawing sheet) so they are in phase.

Frequently, the read/write head that will be used in reading and writing customer data after the disk has been sold is the same head as the read/write head used in producing the servo sensing signals. As a result, the read/write head is generally somewhat narrow, to provide greater disk storage capacity for customer data. As noted, the write element of a read/write head is approximately 85% of DTW and the read element is approximately 50% of DTW. Using a narrow read element causes non-linearity in the response of the read/write head when reading the servo information. The non-linearity can be reduced somewhat by using a narrow servo track; hence, many systems today use servo write steps that are one-third DTW, so that resulting servo pattern bursts are two-thirds DTW.

Narrow servo tracks mean more steps in the servo writing process. The number of servo writing steps for a five thousand data track disk, for example, increases from 10,000 steps to 15,000 steps if the servo pattern bursts are made more narrow by using one-third servo write steps in place of one-half servo write steps. Thus, there is potentially a 50% increase in servo writing time in the effort to obtain a more linear PES signal.

Another problem associated with servo writing relates to the manufacturing tolerances currently achievable. To provide a disk drive configuration with on the order of 25000 data tracks per inch (TPI) would require approximately a one-micron track width. The most precise manufacturing methods presently can produce MR heads within a tolerance of approximately +/−0.3 microns. This manufacturing tolerance is 30% of DTW. With current servo tracks on the order of 0.5 microns, it should be apparent that relatively great inaccuracies can be introduced with narrower servo tracks.

Those skilled in the art will appreciate that position information is decoded by demodulating the signal generated by the head passing over the PES burst patterns to form a signal P based on:

$$P=A-B$$

and to form a quadrature signal Q based on:

$$Q=C-D.$$

Figure 3B:
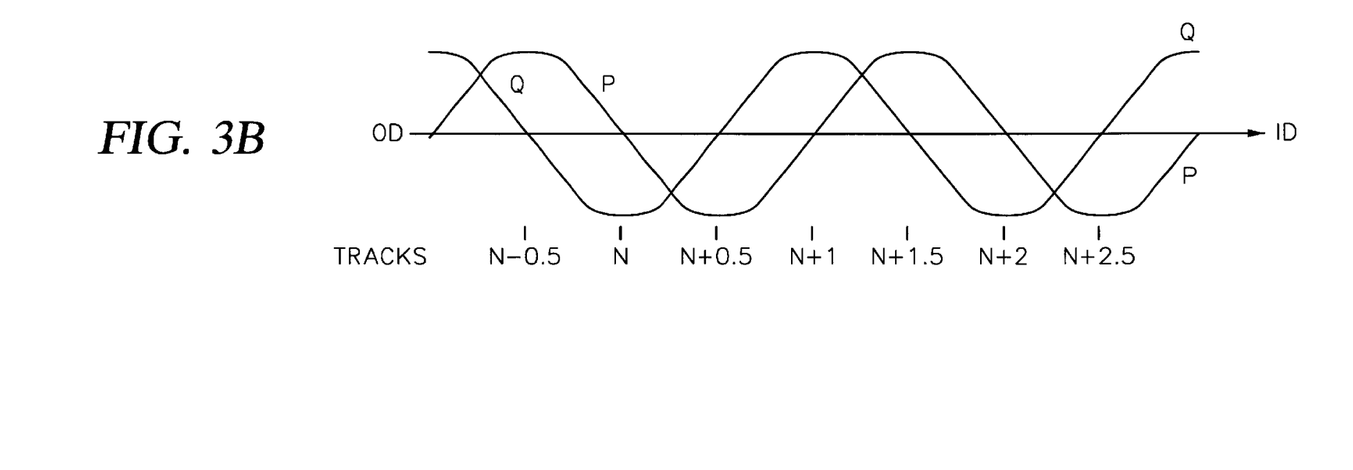
FIG. 3B is a representation of the P signal and Q signal portions of the PES signal produced by the servo pattern illustrated in FIG. 3A.

The signals P and Q are quadrature signals because they are cyclic and are out of phase by 90 degrees (one-quarter signal phase). The P and Q signals corresponding to the FIG. 3A servo pattern are illustrated in FIG. 3B. In the FIG. 3A illustration, the magnetic transitions that comprise the servo pattern are represented by vertical bars. The letter within each group of bars represents the servo burst recorded therein. One burst is distinguished from another by relative position in a track and relative position to the other bursts.

Thus, for a servo head that can detect magnetic transitions from more than one track at a time, the signal P should be zero when the head is tracking exactly along the centerline of track N in FIG. 3A, because when tracking along the centerline the head will receive equal amounts of magnetic field from the A and B servo pattern bursts. A similar situation exists for tracks N+1, N+2, and so forth. For track position N+0.5, the signal Q should be zero when the head is tracking exactly along the N+0.5 half track centerline because the head will receive equal amounts of field from the C and D servo pattern bursts. The signal Q should be zero also for tracks N+1.5, N+2.5, and so forth when tracking along the half track centerline. FIG. 3B shows that the linear range of P and Q is approximately one-half track wide, centered at its zero value points. Only the linear P and Q segments between the |P|=|Q| points are typically used for servo control.

As noted above, it is typical to use the same write element for recording the servo bursts and for recording customer data when the disk is thereafter used, and to use the same read element for reading servo bursts and for reading customer data recorded in the data tracks. For a sector servo disk servo writer using such a combined read/write head, the write element used for recording the servo bursts typically is located a short radial distance from the read element with respect to the disk. This offset distance between the read and write elements of a read/write head changes as the arm skew angle changes, and as the head assembly tracks from the disk outside circumference to the disk inside circumference. The offset distance is illustrated graphically in FIG. 4, where the "e" and "e'" values are shown relative to the read element R and write element W of the read/write head. The letter "P" marks the rotational axis (or pivot point) of the read/write head. The letter "T" indicates the distance from the read element to the center 0 of the disk 22 and the letter "S" indicates the distance from the pivot point to the disk center.

Figure 4:
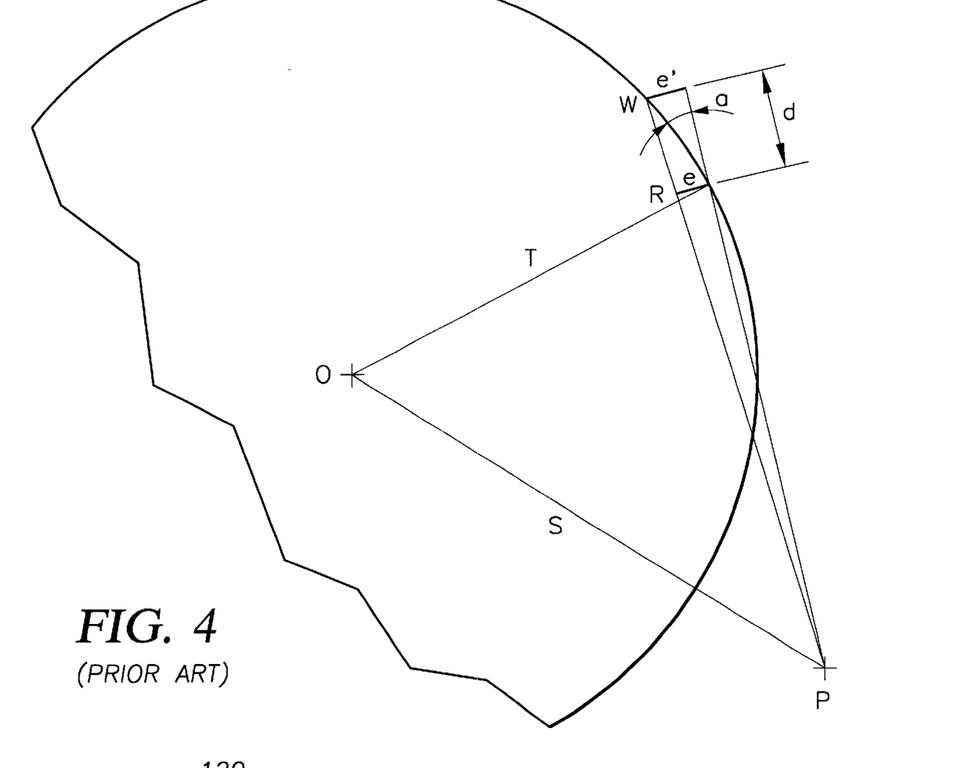
FIG. 4 is a representation of the offset between the read element and write element of the M-R head illustrated in FIG. 2.

Further in FIG. 4, the skew angle of the arm is denoted as "a", and the read and write element separation is written as "d". The offset distance, as the head moves from one disk circumference to the other, can be approximated by the equation:

$$e = d * \tan(a).$$

The offset distance of the read and write elements is usually compensated with the servo position information which is either P or Q, as described. If the offset distance is larger than a full linear range of P or Q, then an additional position error, which is called a "servo write error", is added to the compensation processing. This is done because the adjacent segments of P and Q are produced from different servo bursts, which were written in different servowriter steps. The "servo writer error" therefore is the inaccuracy produced during the servowrite process between pattern steps to form the servo bursts.

From the discussion above, it should be apparent that there is a need for a disk drive system that uses a combined read/write head assembly with the same elements for reading and writing of servo data and also of customer data, and also permits the data tracks to be closely spaced without unduly increasing servowrite time. The present invention fulfills this need.

SUMMARY OF THE INVENTION

The present invention provides an M-R head having a read element that has a servo sensing width as wide as a data track width and a data sensing width that is of lesser width. The two read sensing widths are achieved by using a merged read element having a center electrical contact from the M-R read element, effectively reducing the sensing width of the read element. This permits reading relatively narrow data tracks with the same M-R read element that is used for reading servo data. Thus, the servo read sensing width can be as wide as, or wider than, the width of the data write element. In this way, the present invention provides two sensing widths from a single element.

The wide servo sensing width enables single-step writing of a servo pattern having servo bursts as wide as, or wider than, a data track width (DTW). When the full write width is used to form wide servo pattern bursts, it is not necessary to write the servo track in a series of move and write steps many times the number of data tracks. A position error sensing (PES) signal produced with the wide servo read element and wide servo pattern has increased linearity and accuracy as compared to conventional patterns and heads. A wide servo pattern constructed in accordance with the invention can be implemented in both dual burst and quad burst servo patterns architectures. In this way, servo operations can be carried out with greater accuracy and linearity while accommodating increased data track density. In addition, servo writer track misregistration (TMR) is reduced, because of the greater linear range of PES that can be used to compensate read and write offset distances. The servo pattern can be constructed with a single servo write step, substantially reducing servowrite time.

Other features and advantages of the present invention should be apparent from the following description of the preferred embodiment, which illustrates, by way of example, the principles of the invention.

DESCRIPTION OF THE PREFERRED EMBODIMENTS

Figure 5:
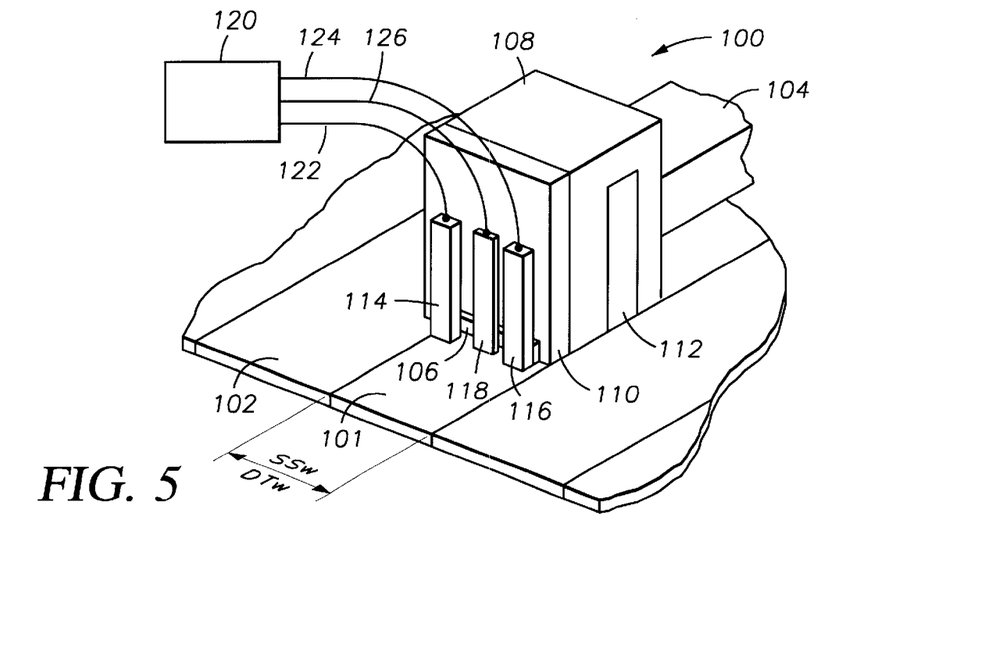
FIG. 5 shows a magneto-resistive (M-R) read/write head constructed in accordance with the present invention relative to a disk having a wide servo pattern recorded in accordance with the present invention.

FIG. 5 shows a read/write head 100 constructed in accordance with the present invention. The read/write head is suspended over a data track 101 of a rotatable storage disk 102 by a rotary arm 104. The read/write head 100 has a read element 106 with a servo sensing width as wide as a data track width and a data sensing width that is less than one data track width. Thus, the M-R read/write head 100 provides two sensing widths from a single read element. In this way, the width of the data tracks can be reduced without having adverse effects on the servo read operations. That is, the servo sensing width can be as wide as, or wider than, the width of the data write element.

FIG. 5 shows that the read/write head 100 comprises what is commonly referred to as a magneto-resistive (M-R) head, which includes the M-R read element 106 and an inductive write element 108. The M-R read element 106 is placed on a non-magnetic support piece 110 that is attached to the write element. The write element includes a magnetic gap 112 containing a magnetic yoke 113 and electromagnetic coils (not shown in FIG. 5). The dual sensing widths from one read element are achieved by three read contacts 114, 116, 118 of the preferred embodiment. The three electrical contacts 114, 116, 118 are connected to a preamplifier circuit 120 of the read/write head 100 by respective electrical wires 122, 124, 126 of the read/write head 100.

Figure 6:
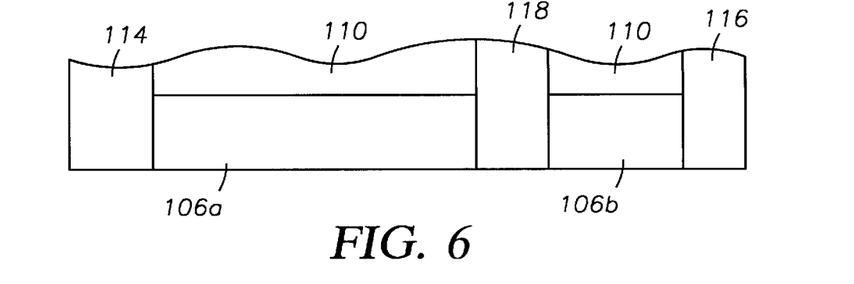
FIG. 6 is a detailed view of the M-R head illustrated in FIG. 5 showing the three sensing electrical contacts of the read element.

FIG. 6 shows the read contacts 114, 116, 118 relative to the sensing element 106. The sensing element includes a servo sensing width or servo read portion 106a and a data sensing width or data read portion 106b, which can be single merged elements that share a common center contact 118, or can be separate, discrete read structures. Each sensing width has a longer aspect ratio, as compared with the conventional read element shown in FIG. 2. The longer aspect ratio provides improved linear response by the head and increases readback signal amplitude. Providing separate sensing widths 106a, 106b permits the servo functions and data functions to be separately optimized.

Figure 7:
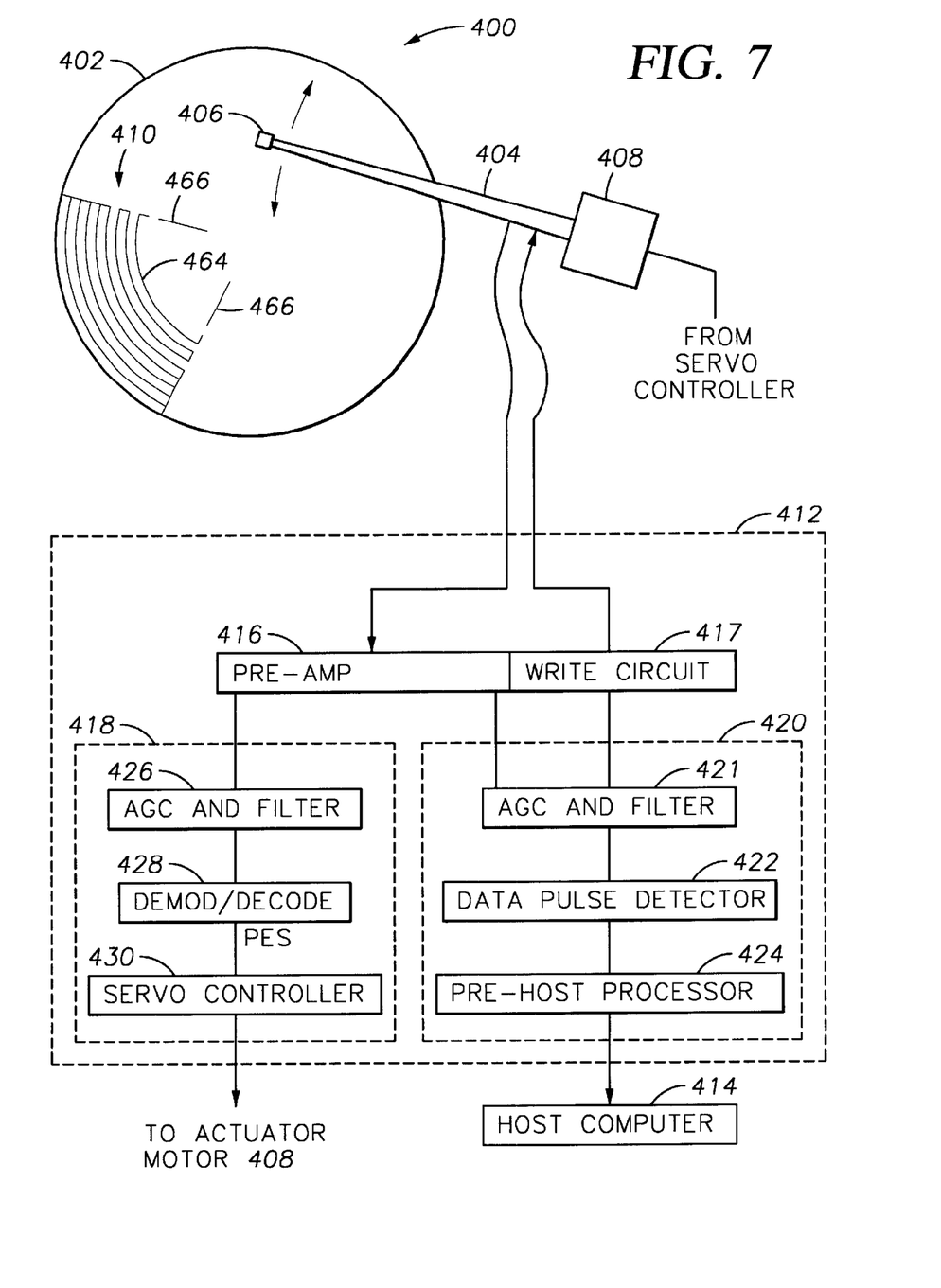
FIG. 7 is a representation of a disk drive system constructed in accordance with the present invention.

FIG. 7 shows a direct access storage device (DASD) disk drive system 400 having one or more disks 402 and an actuator 404 that moves the read/write head 406 of the invention. Only one disk is shown in FIG. 7 for simplicity of illustration. As depicted in FIG. 7, the arm 404 can be moved across the disk 402 by a servo motor 408 to read and record information from tracks 410 of the disk. The read/write head 406 produces a readback signal when it senses, or reads, information from the disk 402 and receives a write signal when it records information onto the disk surface. The actuator motor 408 pivots the actuator 404 under the control of a servo controller 430, thereby changing the position of the read/write head 406 with respect to the concentric tracks 410 of data contained on the disk 402. Although rotary movement of the actuator 404 is depicted for illustrative purposes, the disk drive system 400 may alternatively use another positioning scheme, such as linear extension and retraction of the actuator 404 relative to the tracks 410.

The operation of the disk drive system 400 is managed by a disk drive controller 412, which also serves as an interface between the disk drive 400 and a host computer 414. The host computer may comprise, for example, a desktop computer, a notebook computer, a mainframe computer, or another digital processing device for which storage of data on a disk is desired.

The controller 412 includes a readback signal pre-amplifier 416 ("pre-amp"), which receives electrical representations of servo patterns sensed by the read/write head 406 from the disk 402. With sector servo positioning, the pre-amp 416 preferably serves a dual purpose by amplifying either data or servo signals, depending on whether the read/write head 406 is positioned over stored customer data or servo patterns, respectively. A write circuit 417 is also provided to supply the read/write head 406 with data signals to be written to the disk 402.

As an alternative to the sector servo arrangement illustrated in FIG. 7, the read/write head 406 may be used to sample servo signals from a dedicated servo surface. Although the present invention contemplates both sector servo and dedicated surface embodiments, the sector servo embodiment of the invention will be described herein for consistency and ease of explanation.

In the disk drive controller 412, the amplified signal from the pre-amp 416 is directed to two processing channels: a servo channel 418 and a customer data channel 420. The write circuit 417 is connected only to the data channel. The data channel 420 is used for reading and writing data to and from the disk 402 in response to requests from the host computer 414 to read or write the data.

When operating in conjunction with the data channel 420, the pre-amp 416 amplifies signals from the read/write head 406 that correspond to customer data stored on the disk 402. The data signals from the pre-amp 416 are then provided to an automatic gain control (AGC) and filter circuit 421 of the data channel. Then, a data pulse detector 422 forms digital data pulses corresponding to the analog signals provided by the AGC and filter circuit 421. Next, a pre-host processor 424 converts the data pulses into formatted data strings that are specifically compatible with the host computer 414. The components of the data channel 420 also operate in reverse to write data to the disk 402.

In contrast to the data channel 420, the servo channel 418 generally functions to read servo data from the disk 402 to aid in properly positioning the read/write head 406. When operating in conjunction with the servo channel 418, the pre-amp 416 amplifies the readback servo signal produced when the read/write head 406 senses a servo pattern on the disk 402. The amplified servo signal is provided to an automatic gain control (AGC) and filter circuit 426, which may comprise any one of various known circuits for automatically adjusting the signal gain and filtering it. Next, a demodulator/decoder block 428 receives the readback signal and processes the information to derive a position error sensing (PES) signal, which is related to the position of the read/write head 406 with respect to the desired track center and is indicative of the read/write head position error. The PES signal is then used by a servo controller 430 to generate a corrective signal that, when provided to the actuator motor 408, controls the position of the read/write head 406 to maintain the head centered over a track. The actuator motor 408 may, in an exemplary embodiment, comprise a voice coil motor.

The servo pattern in accordance with the present invention is recorded into, and read from, tracks across the disk 402. In FIG. 7 there are concentric lines 464 to designate servo tracks of the disk, which is partitioned into servo sectors that are represented by radial lines 466. The servo tracks can include several repeated cycles of a servo pattern and can encompass one or more tracks of customer data. One or more customer data sectors are disposed between adjacent servo sectors. After the servo pattern has been recorded and disk production is complete, a user can record and read the user's customer data from the customer data field using, for example, the system illustrated in FIG. 7.

In response to receiving servo information in the readback signal, the disk drive controller 412 generates a position error sensing (PES) signal that indicates the position of the head 406 relative to a disk track, in response to the head readback signal. The PES signal is used by the disk drive controller 412 to generate servo commands that control the servo motor 408 to maintain the head 406 in a correct (centered) position.

Figure 8A:
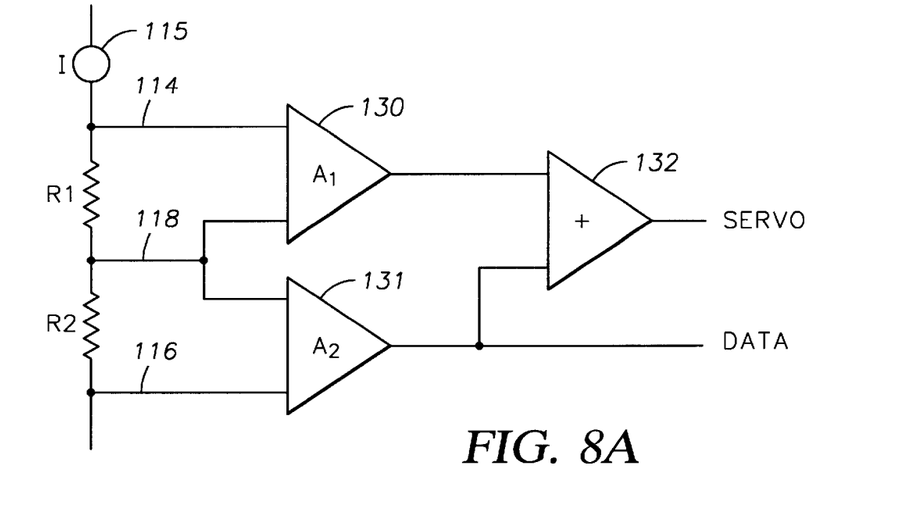
FIG. 8A is a representation of a first readback signal preamplification circuit of the disk drive system illustrated in FIG. 7.
Figure 8B:
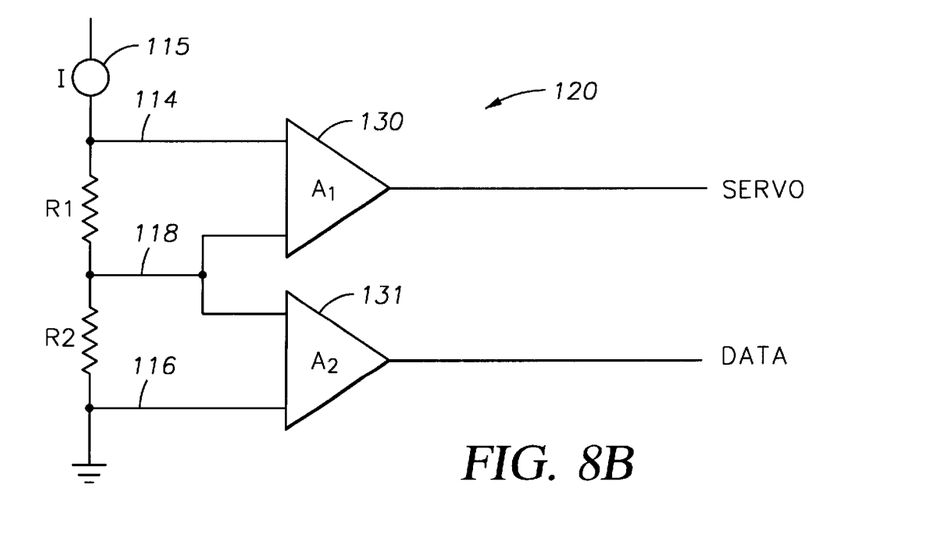
FIG. 8B is a representation of an alternative, second readback signal preamplification circuit of the disk drive system illustrated in FIG. 7.

As noted above, a single read element 106 (FIG. 5 and FIG. 6) provides multiple sensing widths using three read contacts 114, 116, 118 whose signals are combined in a preamplifier circuit 120. FIG. 8A and FIG. 8B show the construction of the preamplifier circuit of the system 400 (FIG. 7) and shows how the signals from the read contacts are combined to produce the servo signal and data signal. In the first configuration, shown in FIG. 8A, the signals from the three read contacts 114, 116, 118 are received in the preamplifier circuit over the three electrical wires 122, 124, 126, respectively. An amplifier 130 is connected to one of the read contacts 114 and to the mid-element read contact 118. A second amplifier 131 is connected between the mid-element contact 118 and the remaining contact 116. Respective resistors R1 and R2 are shown to represent the change of the M-R element resistance on each section of the element during a read operation. The bias current I (represented by the arrow 115) is provided through the M-R element to produce electrical signals for amplification. FIG. 8B shows a second configuration that provides the servo and data sensing from each section of the M-R element.

Figure 9:
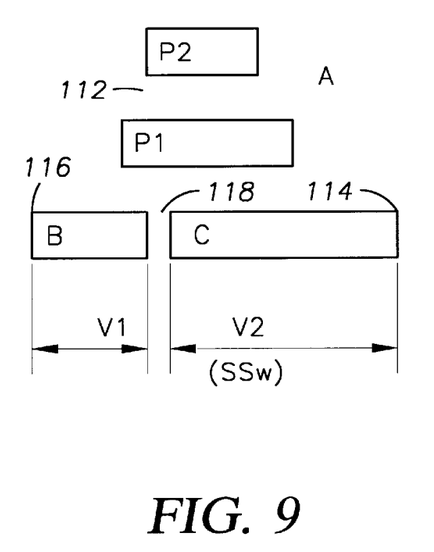
FIG. 9 is a plan view representation of a read/write head constructed in accordance with the present invention, used with the preamplification circuit illustrated in FIG. 8B.

FIG. 9 is a plan view representation of a read/write head constructed in accordance with the present invention, showing the effective size of the write element A (112 in FIG. 5) relative to the effective size of the data sensing width B and the servo sensing width C. The write element A includes pole pieces P1 and P2. As is typical for M-R heads, the data sensing width B and servo sensing width C are composed of different materials. The servo sensing width C is indicated by the "SSW"; the respective widths across tracks are indicated for the data sensing width and for the servo sensing width. In particular, the servo read sensing signal is given by the voltage V2 and the data read sensing voltage is given by V1. In the FIG. 9 embodiment, the servo sensing width and data sensing width can comprise separate, discrete magnetoresistive read elements attached to an inductive write element. In that case, the read element 106 is comprised of a servo sensing width element C and a separate data sensing element B, and the center contact 118 bridges the two sensing elements so that the center contact makes electrical contact with the servo element C and the data element B, although the two contacts themselves do not touch.

It should be noted that the servo read sensing width C illustrated in FIG. 9 is wider than the maximum data write element width A. This provides improved linearity of response. As noted above, data tracks are getting increasingly narrow to enable increased amounts of customer data to be stored on disk. The dual servo/data sensing construction of the read/write head constructed in accordance with the present invention permits reading such relatively narrow data tracks with the same M-R read element used for reading servo data. That is, the data and servo sensing widths can be optimized for their respective functions.

Figure 10:
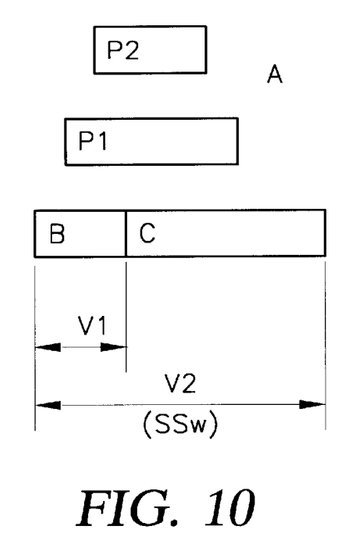
FIG. 10 is a plan view representation of a merged read/write head constructed in accordance with the present invention, used with the preamplification circuit illustrated in FIG. 8A.

FIG. 10 is a plan view representation of an alternative merged react/write head design constructed in accordance with a preferred embodiment of the present invention. In the case of the FIG. 10 merged embodiment, an inductive write element A is again provided, including pole pieces P1 and P2, but the two portions B and C of the read element are in an abutting arrangement and are connected to the electrical contacts 114, 116, 118 such that the read element provides a data sensing width B and a servo sensing width C. That is, the data sensing width and servo sensing width are not provided by spaced-apart elements. Thus, in FIG. 10, the contacts are connected such that the servo sensing width (SSW) is equal to the overall length of the M-R head and the data sensing width is smaller. The effective data sensing width V1 and the effective servo sensing width V2 are indicated in FIG. 10. Again, the dual servo/data sensing construction of the FIG. 10 read/write head constructed in accordance with the present invention permits reading relatively narrow data tracks with the same M-R read element used for reading servo data, so that the data and servo sensing widths can be optimized for their respective functions.

Figure 11:
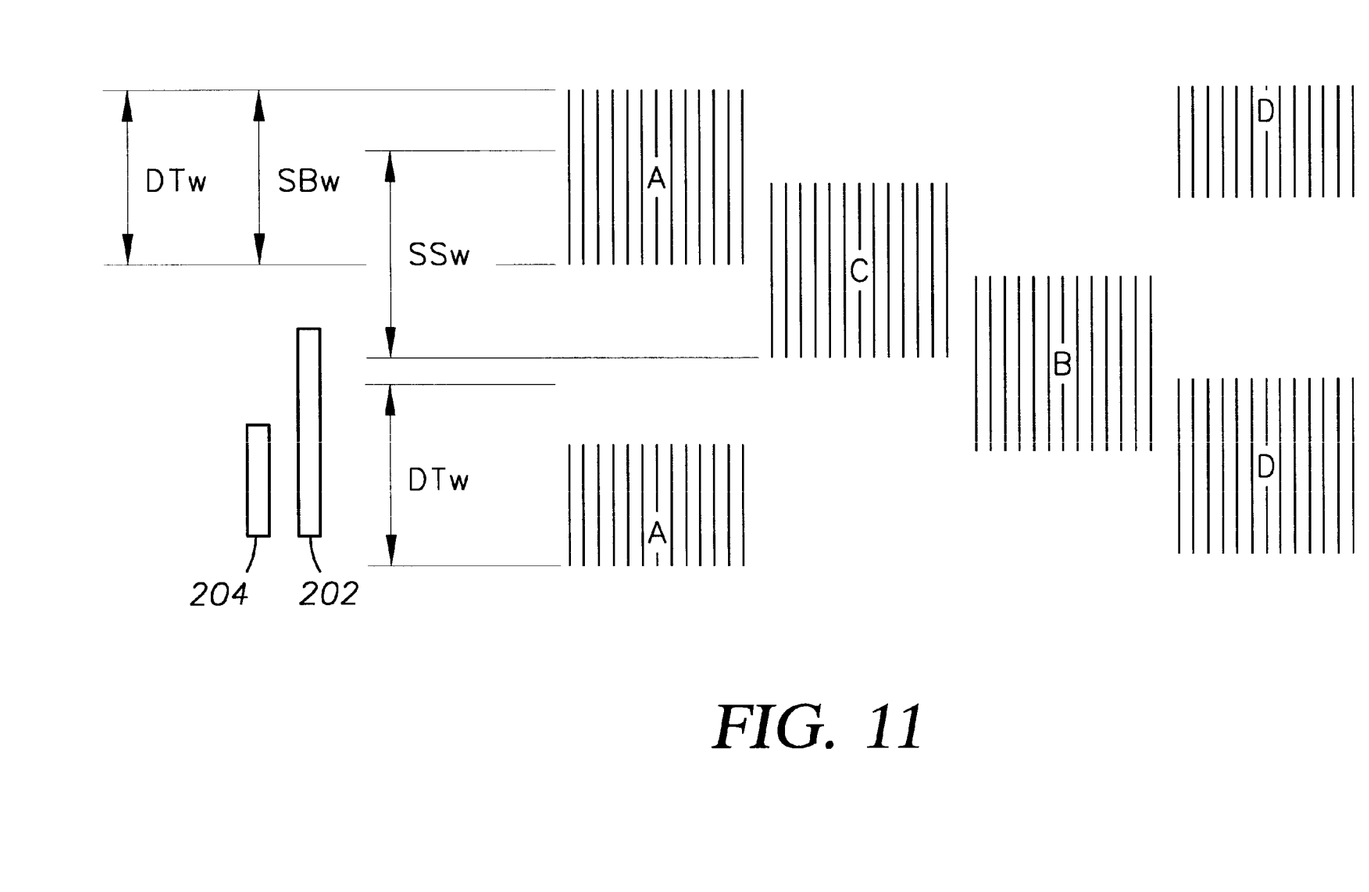
FIG. 11 is a representation of a quad burst servo pattern constructed in accordance with the present invention.

The multiple sensing widths of the read/write head 406 permit using servo patterns of greater than conventional width, for better linearity and more efficient production of servo patterns. FIG. 11 is a representation of a quad burst servo pattern recorded in accordance with the present invention for reading with the M-R head 406 illustrated in FIG. 5. FIG. 11 shows that the servo sensing width (SSW) of the read element 202 is wider than the data track width (DTW) and is wider than the write element 204, and FIG. 11 also shows that the servo burst width (SBW) is approximately equal to one DTW. In FIG. 11, the vertical lines represent magnetic transitions recorded in tracks of the disk shown in FIG. 5 (the tracks run left to right across the drawing sheet of FIG. 11). The letters A, B, C, and D represent the quadrature servo pattern bursts, which will be familiar to those skilled in the art without further explanation. The quadrature PES demodulation is produced using PES equations P=B–A and Q=D–C.

Figure 12:
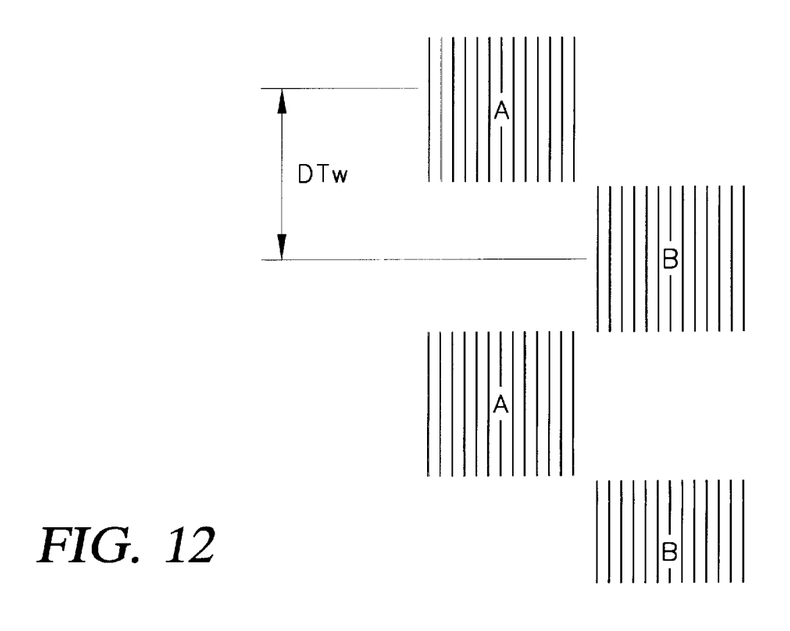
FIG. 12 is a representation of a dual burst servo pattern constructed in accordance with the present invention.

FIG. 12 is a representation of a dual burst servo pattern constructed in accordance with the present invention. FIG. 12 is similar to FIG. 11, except that a dual burst pattern is used rather than the quad burst of FIG. 11. Again, however, it should be noted that the servo sensing width of the read element will be wider than the data track width and wider than the write element. In both FIG. 11 and FIG. 12 each servo burst can be written in a single step, it is not necessary to write the servo tracks in a series of move and write steps many times the number of data tracks on disk. That is, the servo pattern can be recorded with fewer servo write steps. Thus, the disk drive system provides a more accurate servo pattern on the disk and reduces track misregistration (TMR).

Figure 13:
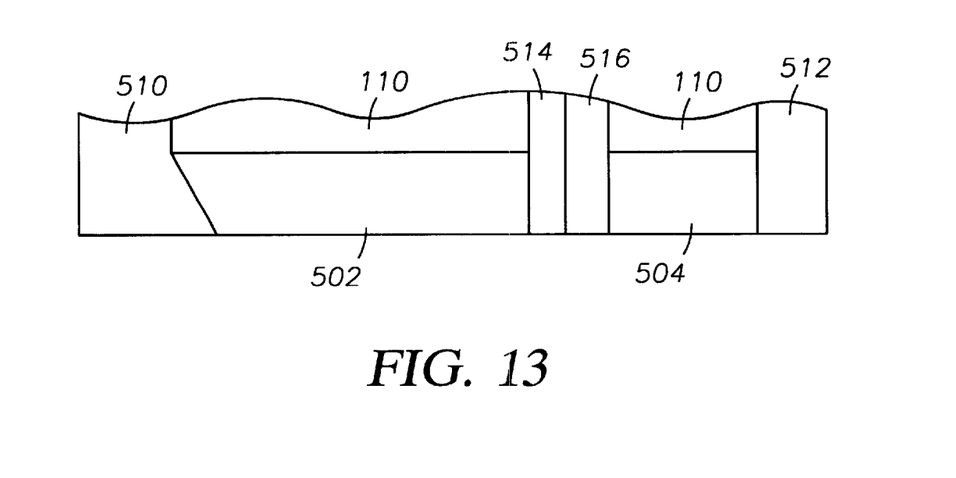
FIG. 13 is a detailed view of an alternative M-R head constructed in accordance with the present invention that provides a more symmetric output signal as compared with the head illustrated in FIG. 6.

Different configurations of read/write heads can be provided in conjunction with the present invention. For example, the dual sensing widths do not have to be provided by the exact configuration shown in FIG. 6. FIG. 13 shows a configuration in which the dual sensing widths from one read element are achieved with two abutting sensing elements 502, 504. One of the sensing elements 502 corresponds to the servo sensing width and the other sensing element 504 corresponds to the read sensing width. As with the FIG. 5 embodiment, the electrical signals for the preamplifier circuit 120 are obtained by a first contact 510 and a second contact 512. In FIG. 13, however, the center contact is provided by a first center contact 514 and a second center contact 516. The first and second center contacts 514, 516 together comprise the center contact. That is, the first center contact 514 abuts the second center contact 516.

Another difference in the FIG. 13 is the flare or oblique cut made across the bottom end of the first contact 510. That is, the bottom edge of the first contact 510 is larger than an intermediate width of the first contact. This has been found to provide increased linearity of the response. Physically distinct sensing elements 502, 504 can be advantageous, as can physically distinct electrical contacts, because they permit the servo sensing and data sensing functions to be independently optimized. In the case of the servo, where it usually is better to have a long aspect ratio for improved linearity, signal amplitude can be improved by the separate sensing elements of FIG. 13, and the impact of erase bands is reduced at the track edges. In the case of the data tracks, it is best to utilize a narrow read head.

Figure 14:
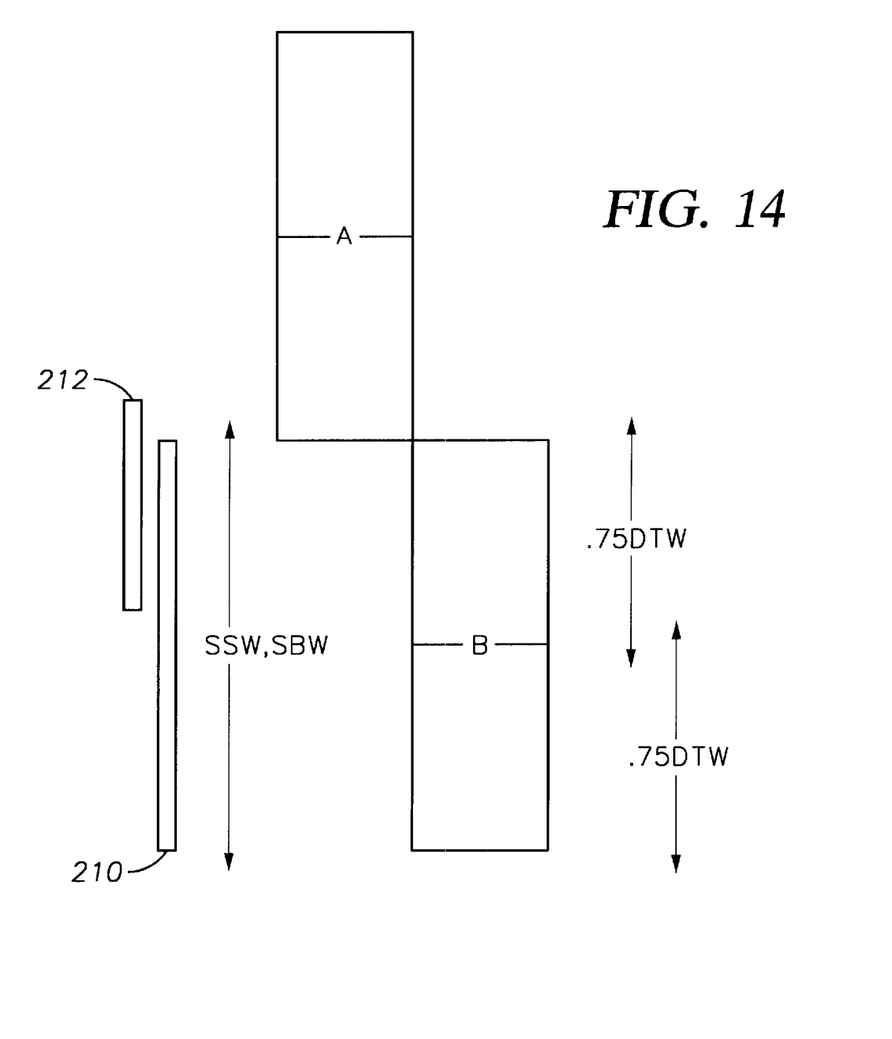
FIG. 14 is a representation of SSW and write element width for a servo pattern constructed in accordance with the present invention.

As noted above, a wide servo burst pattern, having an extended width that is at least as wide as a data track width (DTW), provides advantages for more accurate servo signal demodulation over conventional servo tracks that are less than one DTW. A wide servo burst pattern recorded in accordance with the present invention is illustrated in FIG. 14, which illustrates quadrature servo pattern bursts A and B. The servo pattern illustrated in FIG. 14 has a servo burst width (SBW) that is 1.5 times DTW. FIG. 14 also depicts a servo sensing element 210 and a data/servo write element 212 constructed in accordance with the invention.

The wide servo burst pattern of FIG. 14 is written using a servo write step that is 75% of a DTW, as indicated. This means that two write steps are sufficient to lay down a servo pattern that is 1.5 times the width of a customer data track, the steps being in ¾ data track increments. Many conventional servo writing processes take three passes per servo pattern burst. Therefore, the wide servo pattern write process in accordance with the invention can be completed in less time. Accordingly, the servo sensing width (SSW) of the read element is 1.5 times the DTW.

ADVANTAGES OF THE INVENTION

Thus, two read sensing widths are achieved in an M-R head by using a merged read element having a center electrical contact from the M-R read element. This permits reading relatively narrow data tracks with the same M-R read element that is used for reading servo data. Thus, the servo read sensing width can be as wide as, or wider than, the width of the data write element. In this way, the present invention provides two sensing widths from a single element.

The present invention has been described above in terms of presently preferred embodiments so that an understanding of the present invention can be conveyed. There are, however, many configurations for disk storage systems and servo control systems not specifically described herein but with which the present invention is applicable. The present invention should therefore not be seen as limited to the particular embodiments described herein, but rather, it should be understood that the present invention has wide applicability with respect to disk storage systems and servo control systems generally. All modifications, variations, or equivalent arrangements that are within the scope of the attached claims should therefore be considered to be within the scope of the invention.

We claim:

1. A read head comprising:
   a read element for reading customer data and servo information from a surface of a disk storage media of a direct access storage device, the read head having a data sensing width that senses customer data recorded into a data track of the disk storage media and generates a corresponding electrical signal, wherein the data sensing width is defined by first and second electrical contacts spaced apart on the read element, and having a servo sensing width, distinct from the data sensing width, that senses servo information recorded into the disk storage media and generates a corresponding electrical signal, wherein the servo sensing width is defined by the first electrical contact and a third electrical contact on the read element between the first and second electrical contacts and wherein the servo sensing width is at least as wide as a data track width of the disk storage media.

2. A read head as defined in claim 1, wherein the read element comprises a data sensing width element coupled to the first and second electrical contacts and a separate servo sensing width element spaced apart from the data sensing width element and coupled to the first and third electrical contacts.

3. A read head as defined in claim 2, wherein the third electrical contact bridges the data sensing width element and the servo sensing width element.

4. A read head as defined in claim 1, wherein the data sensing width element adjoins the servo sensing width element.

5. A read head as defined in claim 1, wherein the servo sensing width electrical signals are generated by determining the sum of the signals from the first and third contacts and the data sensing width electrical signals are generated by determining the difference of the signals from the second and third contacts.

6. A disk drive system comprising:
   at least one magnetic media storage disk on which tracks of customer data and servo information can be magnetically stored;
   a write element for recording customer data and servo information into a surface of a storage disk of the disk drive system;
   a read element having a data sensing width that senses customer data recorded into a data track of the disk storage media and generates a corresponding electrical signal, wherein the data sensing width is defined by first and second electrical contacts spaced apart on the read element, and having a servo sensing width, distinct from the data sensing width, that senses servo information recorded into the disk storage media and generates a corresponding electrical signal, wherein the servo sensing width is defined by the first electrical contact and a third electrical contact on the read element between the first and second electrical contacts, and wherein the servo sensing width is at least as wide as a data track width of the disk storage media;
   an actuator motor that moves the write element and read element over the magnetic media storage disk; and
   a disk drive controller that receives the electrical signal from the read element and generates a position error sensing signal that indicates the position of the read element above a track of the magnetic media storage disk and controls the actuator motor to maintain the read element centered over a track.

7. A disk drive system as defined in claim 6, wherein the data sensing width of the read element is defined by first and second electrical contacts spaced apart on the read element, and the servo sensing width is defined by the first electrical contact and a third electrical contact on the read element between the first and second electrical contacts.

8. A disk drive system as defined in claim 7, wherein the read element comprises a data sensing width portion and a servo sensing width portion spaced apart from the data sensing width portion.

9. A disk drive system as defined in claim 8, wherein the third electrical contact bridges the data sensing element portion and the servo sensing element portion.

10. A disk drive system as defined in claim 7, wherein the data sensing width portion adjoins the servo sensing width portion.

11. A disk drive system as defined in claim 7, wherein the servo sensing width portion electrical signals are generated by determining the sum of the signals from the first and third contacts and the data sensing width portion electrical signals are generated by determining the difference of the signals from the second and third contacts.

12. A disk drive system as defined in claim 6, wherein servo information tracks of the magnetic media storage disk are at least as wide as customer data tracks of the magnetic media storage disk.

13. A disk drive system as defined in claim 12, wherein the servo information tracks are wider than the customer data tracks.

14. A disk drive system as defined in claim 12, wherein the data tracks and the servo tracks are located on the same magnetic media storage disk.

15. A disk drive system comprising:
   a read head comprising a read element for reading customer data and servo information from a surface of a disk storage media of a direct access storage device, the read head having a data sensing width that senses customer data recorded into a data track of the disk storage media and generates a corresponding electrical signal, wherein the data sensing width is defined by first and second electrical contacts spaced apart on the read element, and having a servo sensing width, distinct from the data sensing width that senses servo information recorded into the disk storage media and generates a corresponding electrical signal, wherein the servo sensing width is defined by the first electrical contact and a third electrical contact on the read element between the first and second electrical contacts and, wherein the servo sensing width is at least as wide as a data track width of the disk storage media; and
   a recordable storage media, wherein the recordable storage media includes distinct data and servo tracks recorded thereon, such that the servo tracks are at least as wide as the data tracks.

16. The disk drive system of claim 15, wherein the data tracks and the servo tracks are recorded on the same storage media disk.

17. A method of producing a servo pattern comprising servo pattern bursts recorded in servo tracks that extend along a transducing direction on a recordable storage media disk, the method comprising the steps of:
   positioning a read/write head over the storage media disk and recording a first servo pattern burst in a first servo track;
   moving the read/write head across the disk and recording a second servo pattern burst in an adjacent second servo track having a servo track centerline that is located a distance at least as great as one data track width away from the first servo track centerline.

18. A method as defined in claim 17, wherein the step of recording a first servo pattern burst comprises the steps of:
   recording a first burst portion of the first servo pattern burst such that the first burst portion has a width at least as great as one-half a customer data track width;
   moving the read/write head across the disk and recording a second burst portion of the first servo pattern burst such that the second burst portion has a width at least as great as one-half a customer data track width.

19. A method as defined in claim 18, wherein the first burst portion and second burst portion of each servo pattern burst have a width greater than one-half a customer data track width.

20. A read/write head comprising:
   a read element for reading customer data and servo information from a surface of a disk storage media of a direct access storage device, the read head having a data sensing width that senses customer data recorded into a data track of the disk storage media and generates a corresponding electrical signal, and having a servo sensing width, distinct from the data sensing width, that senses servo information recorded into the disk storage media and generates a corresponding electrical signal, wherein the servo sensing width is at least as wide as a data track width of the disk storage media.

21. A read/write head as defined in claim 20, wherein the data sensing width is defined by first and second electrical contacts spaced apart on the read element, and the servo sensing width is defined by the first electrical contact and a third electrical contact on the read element between the first and second electrical contacts.

22. A read/write head as defined in claim 21, wherein the read element comprises a data sensing width element coupled to the first and second electrical contacts and a separate servo sensing width element spaced apart from the data sensing width element and coupled to the first and third electrical contacts.

23. A read/write head as defined in claim 22, wherein the third electrical contact bridges the data sensing width element and the servo sensing width element.

24. A read/write head as defined in claim 21, wherein the data sensing width element adjoins the servo sensing width element.

25. A read/write head as defined in claim 21, wherein the servo sensing width electrical signals arc generated by determining the sum of the signals from the first and third contacts and the data sensing width electrical signals are generated by determining the difference of the signals from the second and third contacts.

* * * * *